Figure 1:
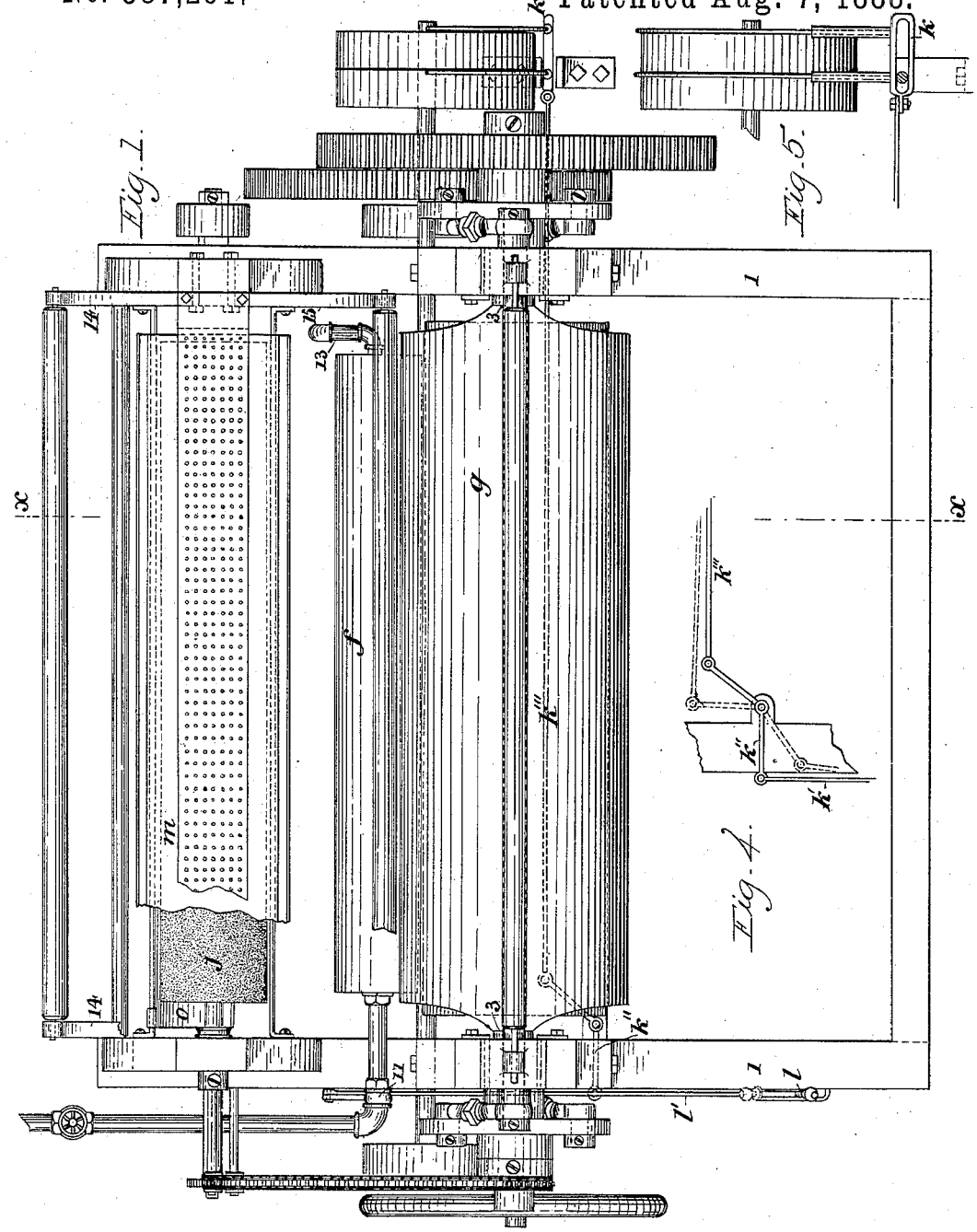

(No Model.) 5 Sheets—Sheet 1.

D. GESSNER.
CLOTH PRESSING MACHINE.

No. 387,291. Patented Aug. 7, 1888.

Witnesses:
D. H. Driscoll.
R. J. Cody.

Inventor;
David Gessner,
by Gifford & Brown.
Attys.

(No Model.)  5 Sheets—Sheet 2.

D. GESSNER.
CLOTH PRESSING MACHINE.

No. 387,291.  Patented Aug. 7, 1888.

Witnesses;
D. H. Driscoll.
R. J. Cody.

Inventor;
David Gessner,
by Gifford & Brown.
Attys.

(No Model.) 5 Sheets—Sheet 3.
D. GESSNER.
CLOTH PRESSING MACHINE.
No. 387,291. Patented Aug. 7, 1888.
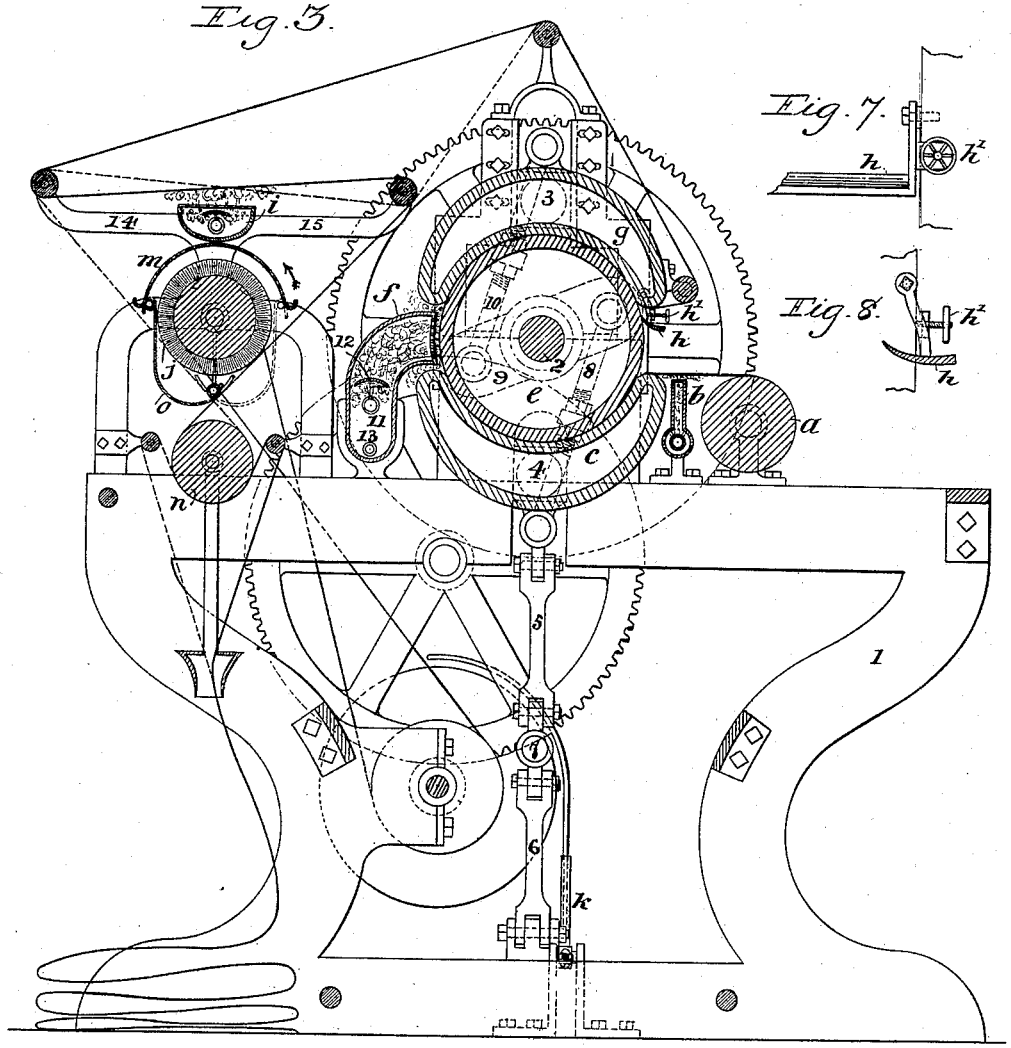

(No Model.) 5 Sheets—Sheet 4.

D. GESSNER.
CLOTH PRESSING MACHINE.

No. 387,291. Patented Aug. 7, 1888.

Witnesses.
Charles T. Wood
R. H. Driscoll,

Inventor,
David Gessner,
by Gifford & Brown.
Attys.

(No Model.)

5 Sheets—Sheet 5.

D. GESSNER.
CLOTH PRESSING MACHINE.

No. 387,291.

Patented Aug. 7, 1888.

United States Patent Office.

DAVID GESSNER, OF WORCESTER, MASSACHUSETTS.

CLOTH-PRESSING MACHINE.

SPECIFICATION forming part of Letters Patent No. 387,291, dated August 7, 1888.

Application filed March 20, 1886. Renewed June 16, 1888. Serial No. 277,349. (No model.)

*To all whom it may concern:*

Be it known that I, DAVID GESSNER, of Worcester, Massachusetts, have invented a new and useful Improvement in Cloth-Pressing Machines, of which the following is a specification.

My invention consists of improvements in cloth-pressing machines, by the use of which a firmer and more lasting pressing is produced upon the goods, and by which their weight is increased, and a superior and more desirable finish given to them than has heretofore been possible to obtain in automatic plate or rotary presses.

Automatic plate or rotary presses are in many respects superior and more labor-saving than the old mode of pressing woolens in a paper or hand press, in which a whole piece of cloth is placed in a folded condition with papers or press-boards between each fold and a hot plate upon each end of a piece so folded, and another press-board interposed between the hot plate and the cloth upon each end of the piece, so that the cloth can in nowise come in contact with the bare hot metal plates themselves; but these automatic presses have one serious disadvantage, inasmuch as goods pressed by them are materially decreased in weight and shrunk in appearance, because during this process the fabric from one end of the piece to the other comes in contact with a hot metal pressing-surface, which removes the moisture which was contained in the goods before entering the machine, and which produces a light, dry, harsh feeling and highly-glazed luster, which are very objectionable and difficult to afterward remove. Several means have been resorted to to overcome these difficulties, but none have been entirely satisfactory. The best known device to day to alleviate this trouble is the application of a damping or steaming apparatus, by which a jet of steam is thrown into the goods in their travel through the machine, either before reaching the pressing-surfaces or after leaving them, or both before and after pressing.

I propose to subject the cloth to successive pressures and subject it to steaming or moistening intermediate the pressures, and preferably also to subject it to steaming or moistening before the first pressure and after the last pressure, either one or both. Thereby the weight of the goods is maintained, their appearance and feeling are improved, and the fibers are so set and fixed as to produce a lasting finish.

The inventions which are the subject of this application may obviously be applied in many cases to automatic plate-presses as well as rotary presses. The special adaptation of the steamers to the automatic plate-press is, however, the subject of a separate application filed March 20, 1886, Serial No. 195,940, as is also the process for the treatment of the cloth, filed March 20, 1886, Serial No. 195,941.

The invention further consists in combining with the steamer or steamers or moistening apparatus connections with the mechanism for stopping the machine, whereby the steam is shut off simultaneously with the stopping of the machine. Thereby the equality of the steaming is preserved, and I prevent spots on the cloth being formed from the excessive steaming at any one point.

The invention further consists in the combination, with the steamer or moistener which acts on the face of the cloth after pressing, of a brush to thoroughly wipe the steam or dampness into the surface fibers of the cloth, and thus more effectually remove the gloss from the face, while the back of the goods retains its luster.

The invention further consists in the combination, with the brush, of a flock-receiver, whereby the flocks removed from the cloth are prevented from again falling onto the same.

The invention further consists in making the stripper whereby the cloth is removed from the cylinder adjustable.

The invention further consists in the combination, with the pressing-surfaces, of a heated surface which is in contact with the cloth after it has received a pressure, and a steamer or other moisture-depositing device which deposits moisture on the cloth as it is moved through the machine in contact with the heated surface.

In the drawings I have shown the form of mechanism in which I propose to embody my invention; but I do not in anywise limit myself to the form of mechanism shown.

Figure 2:
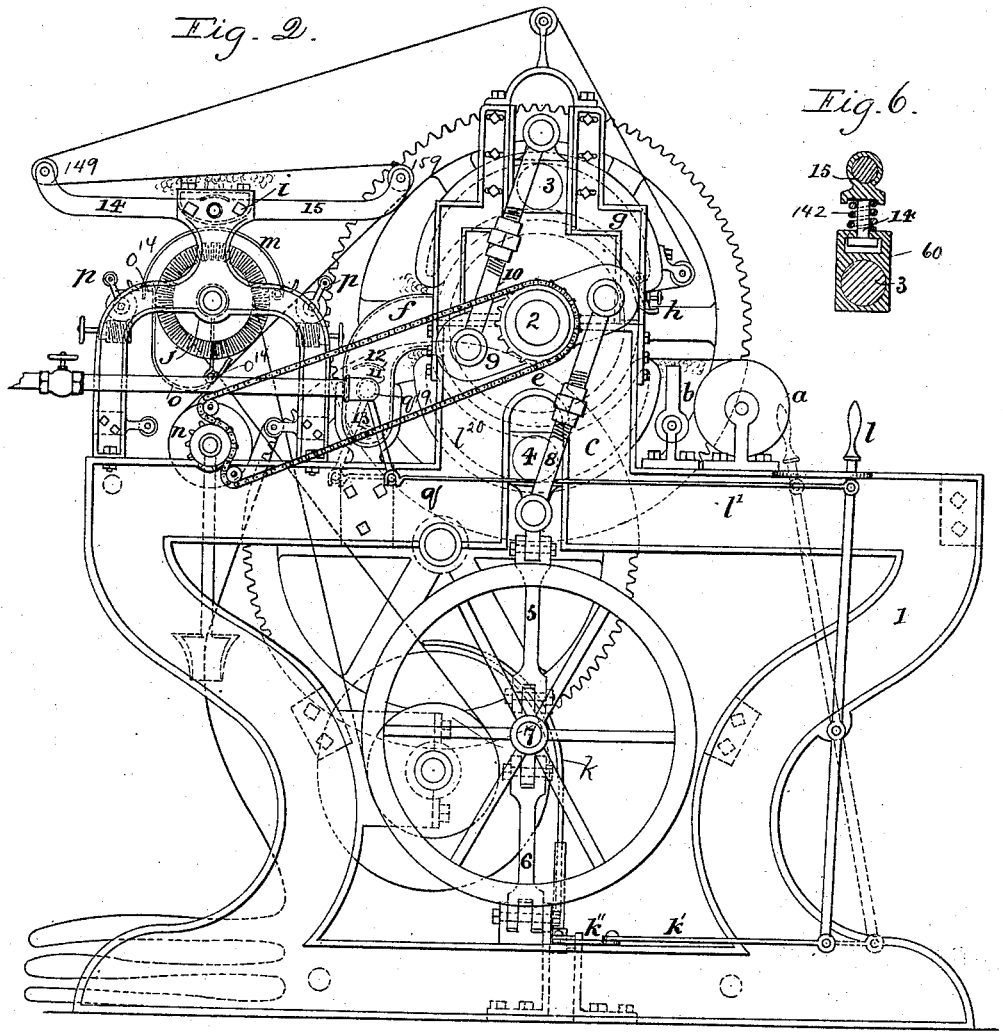
Figure 6:
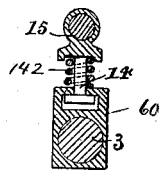
Figure 15:
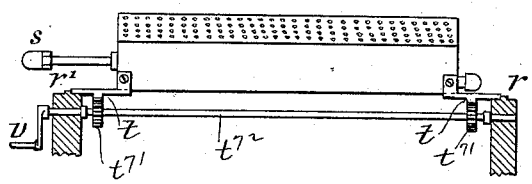
Figure 16:
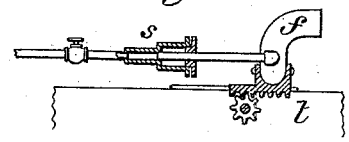
Figure 17:
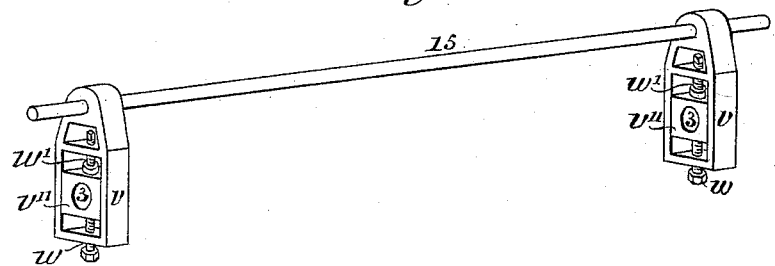

Figure 1 is a plan view of said mechanism with parts broken away. Fig. 2 is an end view of the same. Fig. 3 is an end view in section through the line $x\ x$, Fig. 1. Fig. 4 is a detail view of a portion of the levers used in cutting off steam from the steamers. Fig. 5 is a detail view of the fast and loose pulley with the belt-shifter. Fig. 6 is a detail view of the rod 15 and the journal of the bed-plate and their connecting mechanism, all of which may or may not be employed, as desired. Figs. 7 and 8 are detail views of the adjustable stripper. Figs. 9 to 14, inclusive, represent modifications of the arrangement of cylinder, bed-plates, and steamer. Figs. 15 and 16 represent a modification for making the steamer adjustable to and from the cylinder. Fig. 17 represents two of the sliding boxes and the rod connecting them, with provision for adjustment of the beds.

1 is the frame of the machine. This frame is provided at each end of the machine with an upward extension, $l^{20}$, in which are placed the bearings of the cylinder at 2 and guideways above and below for directing the reciprocating motion of the bearings of the bed-plates at 3 and 4.

$e$ is the cylinder, the bearings of which are fixed in the frame, and which is revolved by suitable gearing.

$c$ and $g$ are bed-plates which are secured to boxes free to reciprocate to and from the cylinder in the guideways of the frame. The reciprocation of one of these bed-plates is effected and the pressure applied to it by a toggle-joint, 5 6, operated by a screw, 7, or other mechanical means. The motion is communicated from one bed-plate to the other by means of the lever and rods 8 9 10. A spring or springs may be introduced, if required, somewhere between the toggle-joint and the bed-plates, so as to give a yielding quality to the pressure.

It will be understood that the arrangement of parts for operating the bed-plates just described is duplicated at each end of the machine, as clearly shown in the drawings. An arrangement for this purpose is shown at Fig. 6, where the journal of one of the bed-plates is shown in its reciprocating box 60 at 3.

15 is the rod or truss to which the actuating-rods are attached, and which extends from end to end of the machine above or below the bed-plate, as the case may be. The spiral spring shown serves to communicate pressure to the sliding box, and the rod 14 serves to move the sliding box backward whenever the pressure is released.

$a$ is a stretcher-roll of ordinary construction.

$b$ is a steamer of ordinary construction, which is so placed as to moisten the cloth just before it receives pressure.

$f$ is a steamer, which may be of the form shown or any other suitable construction, and which is placed so as to supply moisture to the cloth after it has received its first and before it has received its final pressure. This steamer, if it be of the form shown in the drawings, has the perforations for the steam opposite the cylinder from end to end and intermediate the rear edges of the bed-plates. The supply-pipe for the steam is shown at 11, beneath a deflector at 12, and the escape-pipe at 13. A good form for the internal arrangements of the steamer is shown in my application filed June 16, 1888, Serial No. 277,352.

$h$ is a stripper for the purpose of stripping the cloth from the cylinder after it has passed the last pressure. The form and attachment preferred for this stripper are shown more in detail in Figs. 7 and 8, from which it will be seen that at each end the stripper is suspended from the frame by a pivoted arm, and that the distance of the stripper from the cylinder is set by a set-screw, $h'$, passing through an ear on the stripper and bearing against the frame.

$k$ is the belt-shipper fork, by which the machine is started and stopped. It is controlled by the hand-lever $l$ through the system of rods and levers $k'\ k^2\ k^3$. The lever $l$, through the rods $l'$, is also connected with a stop-cock, $q^{19}$, in the steam-supply pipe 11, as shown, so that the passage of the steam onto the cloth may, without fail, be shut off at the same instant that the machine is stopped. The same arrangement may, if desired, be adapted for shutting off the steam from the other steamers in the machine. By this means the steaming or moistening of the cloth is stopped at the instant when the feeding or travel of the cloth is interrupted, and I prevent any unequal moistening, such as would result if the steaming continued while the cloth remained stationary opposite the steamer.

$i$ is a steamer arranged adjacent to the path of the cloth after it has received its last pressure. This steamer is mounted upon an upward extension of the frame, as shown. On either side of the steamer extends an arm, 14 and 15, each having at its extremity a guide-roller, 149 159.

$j$ is a rotary brush arranged below the steamer $i$. $m$ is a cap to prevent any moisture falling from the steamer onto the brush. This cap is turned up at its edges, as shown, so that any moisture falling on it will be conducted off at one end and not fall onto the cloth.

$n$ is a draft-roll driven from the cylinder-shaft.

It will be seen that by the relative arrangement of steamer $i$, brush $j$, and draft and guide rolls the brush will be applied to the same side of the cloth which is steamed; also, that either side of the cloth may be steamed and brushed. For example, the side of the cloth presented to the cylinder in pressing may be steamed and brushed by guiding it in the direction indicated by the unbroken lines, Fig. 3; but the opposite side may be steamed and brushed by guiding it in the direction indicated by the broken lines.

To accommodate the change of direction of the cloth last referred to and at the same time prevent substances brushed from the cloth falling onto the same again, a detachable flock-guard, o, is secured at one side of the brush to a suitable rod and extends downward and part of the way under the brush, so as to substantially inclose that part of the lower circumference of the brush which is not in contact with the cloth. This flock-guard is secured to rods $o^{14}$ at the side and underneath the brush in such a way that it may be detached and shifted from one side to the other, as indicated, respectively, by the unbroken and broken lines in Fig. 3. This is accomplished, as indicated in the drawings, by recurving the upper edge of the flock guard in such manner that it hooks over the rod at the side of the brush, so as to be properly held in position. The lower edge may be supported by a hook, as shown in the drawings, depending from the center of the brush at either end, by which the lower edge of the flock-guard is suspended, whether it be arranged on one side of the brush or on the other.

The amount of pressure exerted by the brush on the cloth may be regulated by the bearing-rolls $p\ p$, which may be adjusted, as shown in Fig. 2, by means of a worm and intermeshing gear regulated by a hand wheel.

In the use of the machine when it is first started up, the steamer should be heated to a certain extent before the cloth is treated, because if the steamer is cold it will condense the steam and throw water onto the cloth, so as to spot it. Therefore it is desirable to turn on the steam in the steamer for a time before the machine is started, so as to warm the steamer and cause it to emit only dry steam. To enable this to be done, I place a hook, $q$, in the connection between the shipper-lever and the steam-cock, by means of which the connection may be broken and the steam turned on without starting the machine. In the use of the machine it will also be found convenient to have provision for moving the steamer $f$ back from the cylinder, so that access can be had to the space between the steamer and cylinder for the purpose of removing obstructions, straightening the cloth, or other attention that may be necessary in practice. The arrangement for accomplishing this is shown in Figs. 17 and 18. The steamer at either end is mounted in guideways on the frame, as at $r\ r'$, or in other suitable supports admitting of a backward movement of the steamer. The steam-supply pipe is provided with a sliding joint, as at $s$, or other joint admitting of the movement of the steamer. The steamer may then be pushed back by hand or may be provided with racks $t\ t'$, gearing with pinions $t^{71}$ on shaft $t^{72}$, as shown, moved by the crank $u$, so that a turn of the crank insures the desired movement of the steamer.

A more ready and accurate means for adjusting the distance between the cylinder and either bed-plate than those heretofore employed by me will be found useful, so as to independently regulate the pressure of each, and, if need be, entirely remove the pressure of one from the cloth without impairing the operation of other parts of the machine. In Fig. 19 is shown an arrangement suitable for this purpose.

$v\ v'$ are the boxes for the journals of the bed-plates, which slide in guideways in the frame, as heretofore described.

15 is the rod connecting the boxes at the opposite ends of each bed-plate together, and to the opposite ends of which rod the actuating-arms are attached, as before set forth. Within each of the boxes $v\ v'$ is mounted in guideways a secondary box, $v''$, within which the bed-plate is journaled, as at 3. This secondary box $v''$ is suspended between the set-screws $w\ w'$, by the adjustment of which the bed-plate may be raised or lowered at will. The upper set-screw is screwed into the top of the box $v''$, so that the box will still be suspended by it in case the lower set-screw becomes accidentally loosened.

In Fig. 19 the boxes for the upper bed-plate are shown. The same arrangement will be used, inverted, for the lower bed-plate, provided that in each case it is the upper set-screw which makes connection with the box $v$, as above described.

I have shown at Figs. 9, 10, 11, 12, 13, 14 modifications of the arrangement of bed-plates, cylinder, and steamer.

Figure 9:
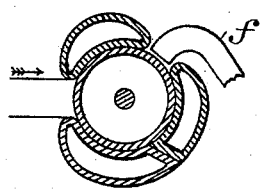

In Fig. 9 there are three bed-plates, and the steamer $f$ is interposed between the first and second.

Figure 10:
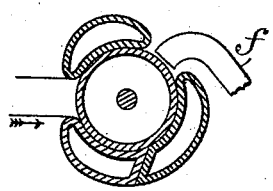

In Fig. 10 there are still three bed-plates; but the steamer is interposed between the second and third.

Figure 11:
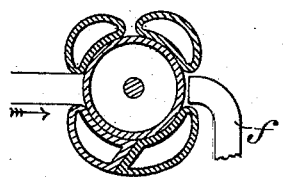
Figure 12:
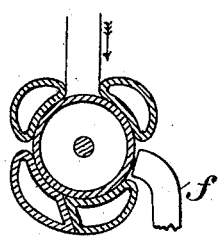

In Figs. 11 and 12 are each shown a cylinder with four bed-plates, and a steamer interposed in one case between the second and third bed-plate, and in the other case between the first and second. There are other combinations possible; but those here illustrated will be sufficient to indicate the range of utility for the steamer intermediate the first and final pressures.

Figure 13:
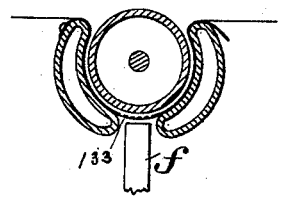

In Fig. 13 is shown a single cylinder and two bed-plates, with a sheet-metal jacket, 133, connecting the two bed plates, and the steamer so arranged as to throw steam into the cloth through perforations in the sheet-metal jacket intermediate the two bed-plates. It is plain that this sheet-metal jacket might be employed with the steamer and bed-plates in the other modifications shown.

Figure 14:
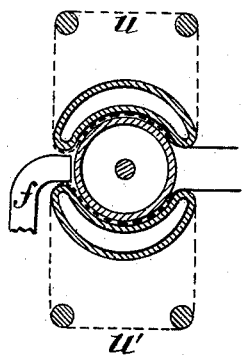

In Fig. 14 is shown a single cylinder and two bed-plates with endless traveling belts $u'\ u'$ for carrying the cloth forward while under pressure, the steamer being, as before, applied intermediate the pressures.

The cylinder and bed-plates being hollow, as shown in each arrangement, are heated by filling their interiors with steam, as heretofore, supplied by well-known devices.

The machine operates as follows: The cloth, after well-known preliminary treatment, passes over the stretcher-roll a, by which it is freed from wrinkles; thence past the steamer b, by which it is supplied with moisture; thence between the bed-plate c and cylinder e, where it receives its first pressing and heating and is thereby deprived of considerable moisture; thence past the steamer f, from which it receives moisture to more or less make up for that lost in the first pressing and to prepare it for the succeeding pressure; thence between the bed-plate g and cylinder e, where it receives its final pressure. Then it is removed by the stripper h from the cylinder and passes over suitable rolls, as shown, past the steamer or dampener i, which reduces the luster on the face of the goods and supplies moisture; thence past the rotary brush j, which makes more effective the operation of the steamer; thence over the draft-roll n, and so out of the machine. The guide-rolls are so arranged in connection with the steamer i and brush j that the cloth may be steamed and brushed on either side, as preferred, and as indicated by the broken and unbroken lines in the drawings.

Some of the advantages of the treatment of the cloth, as described, may be stated as follows: Heretofore the custom in automatic plate or rotary presses has been to subject the cloth to one steaming, as by the steamer b, just before the first pressure. Sometimes an additional steamer has been used after the pressing.

The disadvantage in these presses has been that the cloth has lost in weight and body by shrinkage by reason of the excessive dry heat and pressure to which it has been subjected. By producing more than one pressing (as by the two bed-plates c and g) and by interposing the steaming between the first and final pressing I overcome the difficulty referred to and am enabled to retain the weight and body desired. Furthermore, by injecting steam or moisture into the fabric while in the pressed and heated condition in which it emerges from the first pressing and then subjecting it as it emerges from the steamer to a second pressing, the fiber is set and solidified, so that the firmness and texture of the fabric are improved and the finish will better withstand the ordinary conditions of wear.

Although I have shown various arrangements of cylinder, bed-plates, and steamer, and although I do not limit myself to any particular arrangement, yet I prefer those arrangements, as in Fig. 3 and other figures, where the steam is applied while the cloth is still in contact with the cylinder.

In the arrangements shown in the drawings the two bed-plates about the cylinder serve to hold the cloth in contact with the heated surface—which in this case is the cylinder—between the bed-plates. The moisture from the steamer thus strikes the cloth at a point where it rests against a heated surface. The heat by attracting the moisture assists its entrance into the cloth and prevents condensation, and the surface prevents the steam from escaping from the cloth on that side. In case either of the bed-plates is dispensed with, other mechanism—such as guide-rolls—may be employed to assist in holding the cloth against the cylinder or heated surface in front of the steamer.

When there are more than two bed-plates, I may use more than one steamer, interposing the same between the bed-plates and regulating the number in accordance with the class of goods to be finished.

I do not broadly claim a stripper for freeing the cloth from the cylinder, that being the subject of claim in another application, filed June 16, 1888, Serial No. 277,350.

In my application filed March 20, 1886, Serial No. 195,940, I have claimed certain features shown in the present application which I do not wish to be understood as claiming herein.

I claim—

1. The combination, with pressing devices constructed to press the cloth at two or more points successively, of a steamer or moistening apparatus interposed between the successive pressing-points, and mechanism constructed to heat the pressing devices succeeding the steamer or moistening apparatus, whereby the cloth receives a steaming or moistening intermediate two pressings, the latter of which pressings is hot, substantially as described.

2. The combination, with pressing devices constructed to press the cloth at two or more points successively, of a steamer or moistening apparatus interposed between the successive pressing-points, whereby the cloth receives steaming or moistening intermediate the pressings, and a steamer or moistener arranged to deposit steam or moisture on the cloth before the first pressing, substantially as described.

3. The combination, with pressing devices constructed to press the cloth at two or more points successively, of a steamer or moistening apparatus interposed between the successive pressing-points, whereby the cloth receives steaming or moistening intermediate the pressings, and a steamer or moistener arranged to deposit steam or moisture on the cloth after the last pressing, substantially as described.

4. The combination, with pressing devices constructed to press the cloth at two or more points successively, of a steamer or moistening apparatus interposed between the successive pressing-points, whereby the cloth receives steaming or moistening intermediate the pressings, and a steamer or moistener arranged to deposit steam or moisture on the cloth before the first pressing, and a steamer or moistener arranged to deposit steam or moisture on the cloth after the last pressing, substantially as described.

5. The combination, with pressing devices constructed to press the cloth at two or more points successively, of a steamer or moistening apparatus interposed between the successive pressing-points and provided with mechanism for adjusting it to and from the cloth, whereby the cloth may or may not be steamed or moistened intermediate the pressings, substantially as described.

6. The combination, with a cylinder, of two or more bed-plates arranged around the same, and a steamer or moistener interposed between the bed-plates, whereby the cloth receives a steaming or moistening as it passes from one bed-plate to the next, substantially as described.

7. In a cloth-pressing machine, in combination with the apparatus for stopping the feed of the machine and a steamer or moistener for supplying moisture to the cloth, connections, substantially as described, interposed, whereby the act of stopping the feed intercepts the passage of the moisture onto the cloth, substantially as described.

8. In a cloth-pressing machine, in combination with the pressing-surfaces and a steamer arranged in the path of the cloth as it leaves the pressing-surfaces, a brush arranged in the path of the cloth as it leaves the steamer, whereby the moisture is diffused among the fibers on the face of the cloth, substantially as described.

9. In a cloth-pressing machine, in combination with the pressing-surfaces, a brush arranged in the path of the cloth after it leaves the pressing-surfaces and on the side of the cloth which was presented to the cylinder in pressing, substantially as described.

10. In a cloth-pressing machine, the combination, with the pressing-surfaces, of a brush arranged in the path of the cloth after leaving the pressing-surfaces, and three guides, whereby either surface of the cloth may be brought in contact with the brush, substantially as described.

11. In combination with a rotary brush, a flock-receptacle extending only partially round the lower semi-circumference of the brush and adapted to be shifted from one part of the lower semi-circumference to another, substantially as described.

12. A machine for pressing cloth having pressing devices constructed to press the cloth, a heated surface arranged to be in contact with the cloth after it receives a pressing, a steamer or moistener movable independently of the pressing devices and arranged to deposit steam or moisture on the cloth after being pressed and as it is in contact with said heated surface, and mechanism for adjusting the steamer or moistener to and from the cloth, substantially as described.

13. In combination, the cylinder, the bed-plates mounted in reciprocating supports $v$, the sliding boxes $v''$, and means for adjusting the same in said supports, whereby the bed-plates may be adjusted in their supports, substantially as described.

14. In combination, the cylinder and the bed-plate, whereby the cloth is pressed, and a stripper arranged with its edge close to the surface of the cylinder where the cloth is to leave the cylinder, and means, substantially as described, whereby the stripper is supported and rendered adjustable, as specified.

15. A machine for pressing cloth having pressing devices constructed to press the cloth, a heated surface traveling in contact with the cloth after receiving a pressing, and a steamer or moistener, whereby steam or moisture is deposited on the cloth while it is in contact with said heated surface, substantially as described.

16. A machine for pressing cloth having pressing devices constructed to press the cloth, a continuously-operating feed, a heated surface arranged to be in contact with the cloth after it receives a pressing, and a steamer or moistener, whereby steam or moisture is deposited on the cloth when it is in contact with said heated surface, substantially as described.

17. A machine for pressing cloth having pressing devices constructed to press the cloth at two or more points successively, a heated surface arranged to be in contact with the cloth between the successive pressing-points, and a steamer or moistener, whereby steam or moisture is deposited on the cloth while it is in contact with said heated surface, substantially as described.

18. A machine for pressing cloth having pressing devices constructed to press the cloth at two or more points successively, a continuously-operating feed, a heated surface arranged to be in contact with the cloth between said pressing-points, and a steamer or moistener, whereby steam or moisture is deposited on the cloth while it is in contact with said heated surface, substantially as described.

19. The combination of a cylinder and a bed-plate and devices constructed to hold the cloth in contact with the cylinder after it leaves the bed-plate, and a steamer or moistener, whereby the cloth receives steaming or moistening after pressing and while in contact with the cylinder, substantially as described.

DAVID GESSNER.

Witnesses:
LIVINGSTON GIFFORD,
R. J. CODY.